United States Patent
Chang et al.

(10) Patent No.: US 9,904,635 B2
(45) Date of Patent: Feb. 27, 2018

(54) HIGH PERFORMANCE TRANSACTION-BASED MEMORY SYSTEMS

(71) Applicant: SAMSUNG ELECTRONICS CO., LTD., Suwon-si, Gyeonggi-do (KR)

(72) Inventors: Mu-Tien Chang, Santa Clara, CA (US); Hongzhong Zheng, Sunnyvale, CA (US); Liang Yin, San Jose, CA (US)

(73) Assignee: Samsung Electronics Co., Ltd. (KR)

( * ) Notice: Subject to any disclaimer, the term of this patent is extended or adjusted under 35 U.S.C. 154(b) by 251 days.

(21) Appl. No.: 14/959,773

(22) Filed: Dec. 4, 2015

(65) Prior Publication Data

US 2017/0060788 A1 Mar. 2, 2017

Related U.S. Application Data

(60) Provisional application No. 62/210,935, filed on Aug. 27, 2015.

(51) Int. Cl.
*G06F 13/14* (2006.01)
*G06F 13/16* (2006.01)
*G06F 13/40* (2006.01)

(52) U.S. Cl.
CPC ...... *G06F 13/1668* (2013.01); *G06F 13/4068* (2013.01)

(58) Field of Classification Search
None
See application file for complete search history.

(56) References Cited

U.S. PATENT DOCUMENTS

| | | | | |
|---|---|---|---|---|
| 5,617,556 | A * | 4/1997 | Baumgartner | G06F 12/0835 711/118 |
| 6,715,046 | B1 * | 3/2004 | Shoham | G06F 13/1605 711/118 |
| 7,076,617 | B2 * | 7/2006 | Dodd | G06F 12/0215 711/105 |
| 7,089,379 | B1 | 8/2006 | Sharma et al. | |
| 8,380,940 | B2 | 2/2013 | Wang et al. | |
| 8,949,501 | B1 * | 2/2015 | Akhter | G06F 13/4022 370/412 |
| 2008/0189479 | A1 | 8/2008 | Cope et al. | |
| 2012/0036296 | A1 | 2/2012 | Wingard et al. | |
| 2012/0054455 | A1 | 3/2012 | Wang et al. | |
| 2012/0239873 | A1 | 9/2012 | Huang et al. | |
| 2014/0068125 | A1 | 3/2014 | Pullagoundapatti et al. | |
| 2014/0160935 | A1 * | 6/2014 | Zecharia | H04L 47/34 370/235 |
| 2015/0106560 | A1 | 4/2015 | Perego et al. | |

* cited by examiner

*Primary Examiner* — Cheng-Yuan Tseng
(74) *Attorney, Agent, or Firm* — Innovation Counsel LLP (57) ABSTRACT

A memory system includes a master controller, an interface with a host computer, and a link bus configured to couple with a slave controller. The master controller includes an address mapping decoder, a transaction queue, and a scheduler. The address mapping decoder is configured to decode address mapping information of a memory device coupled to the slave controller. The scheduler of the master controller is configured to reorder memory transaction requests received from the host computer in the transaction queue using the address mapping information of the memory device. The memory system employs an extended open page policy based on the pending memory transaction requests in the transaction queue of the master controller.

20 Claims, 4 Drawing Sheets

HIGH PERFORMANCE TRANSACTION-BASED MEMORY SYSTEMS

CROSS-REFERENCE TO RELATED APPLICATION(S)

This application claims the benefits of and priority to U.S. Provisional Patent Application Ser. No. 62/210,935 filed Aug. 27, 2015, the disclosure of which is incorporated herein by reference in its entirety.

TECHNICAL FIELD

The present disclosure relates generally to memory systems for computers and, more particularly, to high performance transaction-based memory systems.

BACKGROUND

Synchronous DRAM (SDRAM) has a synchronized interface with a memory controller and synchronously responds to the memory controller at a speed of a system bus of a computer. A clock signal of the computer is used to drive an internal finite state machine (FSM) that pipelines incoming commands from the memory controller. Data storage of SDRAM is divided into several banks, allowing the memory controller to simultaneously process several memory access commands that are interleaved among the separate banks This allows higher data access rates than asynchronous DRAM.

Transaction-based memory systems have recently gained attentions for their higher memory capacity, higher bandwidth, and design flexibility. Examples of transaction-based memory systems include a buffer-on-board type (e.g., Intel® Scalable Memory Buffer (SMB)), a hybrid memory cube (e.g., Micron® Hybrid Memory Cube (HMC)), and HP® Gen-Z®.

Unlike synchronous memory systems, a memory controller in a transaction-based memory system does not communicate directly with DRAMs. Instead, the memory controller (i.e., a master controller) of a computer system communicates with a DRAM controller (i.e., a slave controller) asynchronously over a point-to-point link bus, and the DRAM controller communicates with the DRAMs over a memory channel (e.g., double data rate (DDR) memory channel) using memory commands (e.g., DDR memory commands standardized by the Joint Electron Device Engineering Council (JEDEC)). Examples of standard memory commands include activate, read, write, precharge, and refresh. The activate command activates a row in a particular bank. The read and write commands initiate a read and a write burst to an activated row. The precharge command closes an activated row in a particular bank. The refresh command starts a refresh operation. The memory banks are precharged when a refresh command is issued.

In a conventional transaction-based memory system design, a master controller and a slave controller are loosely coupled and exchange little information. The loosely coupled master and slave controllers provide design flexibility and efficient management of the memory system. However, the loose coupling between the master and the controllers may result in non-optimized performance. For example, rank/bank interleaving and row buffer management are handled by a slave controller alone. Due to power and cost concerns, the slave controller may have limited resources including a small buffer and a simple logic. The limited resources on the slave controller may limit its scheduling and row buffer management capabilities. The master controller, on the other hand, may have plenty of resources and buffers that are potentially capable of enhancing the performance of the memory system by overcoming the limited capabilities of the slave controller.

SUMMARY

A memory system including a master controller, an interface with a host computer, and a link bus configured to couple with a slave controller is described. The master controller includes an address mapping decoder, a transaction queue, and a scheduler. The address mapping decoder is configured to decode address mapping information of a memory device coupled to the slave controller. The scheduler of the master controller is configured to reorder memory transaction requests received from the host computer in the transaction queue using the address mapping information of the memory device. The memory system employs an extended open page policy based on the pending memory transaction requests in the transaction queue of the master controller.

According to one embodiment, a memory module includes: a slave controller including a decoder, a scheduler, a command queue, and a read return queue; and a memory device. The decoder is configured to receive memory transaction requests, generate memory commands based on the memory transaction requests, and place the memory commands in the command queue. The decoder is further configured to receive a plurality of flags and reorder the memory commands in the command queue based the plurality of flags.

According to one embodiment, a method for improving performance of a memory system includes: receiving address mapping information of a memory device from a slave controller over a link bus; receiving memory transaction requests from a host computer; placing the memory transaction requests in a transaction queue; and reordering the memory transaction requests in the transaction queue using the address mapping information of the memory device.

According to one embodiment, a method for improving performance of a memory system include: sending address mapping information of a memory device to a master controller over a link bus; receiving memory transaction requests; decoding the memory transaction requests and generating memory commands based on the decoded memory transaction requests; placing the memory commands in a command queue; receiving a plurality of flags; and reordering the memory commands in the command queue based the plurality of flags.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a transaction-based memory system and a method of driving the same. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure provides a transaction-based memory system that is capable of providing high performance and a method of driving the same. The present transaction-based memory system overcomes the limitations of loosely coupled master and slave controller design in which no address mapping information of a memory device is propagated to the master controller. The master controller of the present transaction-based memory system is deeply involved in scheduling and row buffer management that are typically handled by a slave controller. Having a deeper buffer and more complex logic, the master controller can provide better scheduling and memory management decisions, compared to relying upon a slave controller alone. In particular, the present transaction-based memory system provides better channel/rank/bank interleaving (i.e., more parallelisms), and more effective row buffer management (i.e., more page hits), as will be explained in further detail in the following examples and embodiments.

Figure 1:
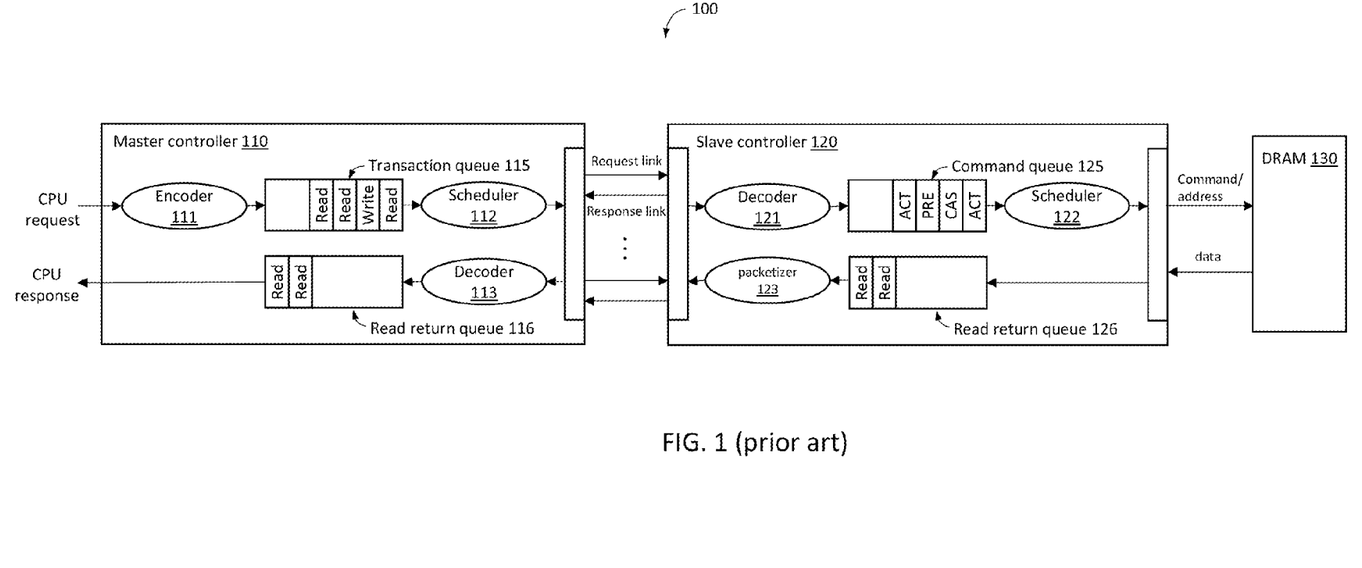
FIG. 1 shows a block diagram of a conventional transaction-based memory system.

FIG. 1 shows a block diagram of a conventional transaction-based memory system. The transaction-based memory system 100 includes a master controller 110 (e.g., host memory controller) and the slave controller 120 (e.g., DRAM controller), and a memory device 130 (e.g., DRAM). The master controller 110 receives a request from a CPU to access the memory device 130 and responds to the CPU corresponding to the request. The master controller 110 includes an encoder 111, a scheduler 112, a decoder 113, a transaction queue 115, and a read return queue 116.

The encoder 111 encodes the CPU requests and places the encoded requests in the transaction queue 115. The encoded requests may include a memory read from and a memory write to an address or an address block of the memory device 130. The scheduler 112 of the master controller packetizes the requests in the order the requests are placed in the transaction queue 115 and sends the packetized requests to the slave controller 120 over a request link of the link bus between the master controller 110 and the slave controller 120.

The slave controller 120 includes a decoder 121, a scheduler 122, a packetizer 123, a command queue 125, and a read return queue 126. The decoder 121 decodes the packets received from the master controller 110 via the request link, generates corresponding memory commands, and places them in the command queue 125. The scheduler 122 sends the memory commands and the associated memory address to the memory device 130 and receives data from the memory device 130. The slave controller 120 places the read data from the memory device 130 in the read return queue 126. The packetizer 123 packetizes the response received from the memory device 130 (e.g., data read from a memory address) and sends the packetized response to the master controller 110 over a response link of the link bus between the master controller 110 and the slave controller 120.

The decoder 113 of the master controller 110 decodes the packets received from the slave controller 120 via the response link, places the decode packets in the read return queue 116, and sends the data back to the CPU in the order the read data are placed in the read return queue 116. The communication between the master controller 110 and the slave controller 120 is limited to the exchange of packets over the link bus. The slave controller 120 does not share the address mapping information of the DRAM 130 with the master controller 110, therefore the scheduler 112 of the master controller 110 cannot pre-schedule pending requests in the transaction queue 115 when sending the request packets to the slave controller 120.

Figure 2A:
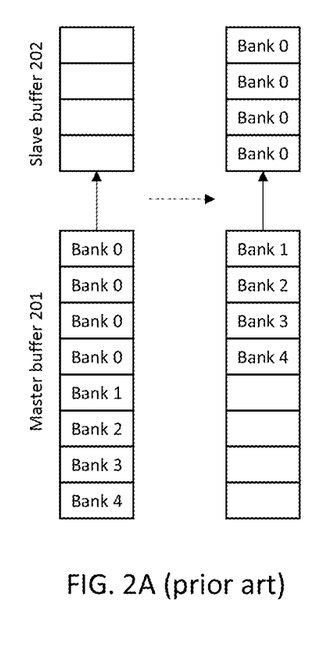
FIG. 2A shows a comparative example of memory mapping between a master buffer and a slave buffer.

FIG. 2A shows a comparative example of memory mapping between a master buffer and a slave buffer. Referring to the example of the conventional transaction-based memory system 100 of FIG. 1, the master controller 110 merely places the encoded CPU requests in the transaction queue 115. For example, the requests in the transaction queue 115 and the associated memory address and/or data are stored in a first-in first-out (FIFO) buffer, and the scheduler 112 sends the encoded CPU requests along with the memory address/data to the slave controller 120 in the order the requests are placed in the FIFO buffer. Since the master controller 110 does not have address mapping information of the DRAM 130, the master controller 110 sends the CPU requests to the slave controller 120 in the order they are placed in the transaction queue 115 without bank interleaving.

The master controller 110 has a master buffer 201, and the slave controller 120 has a slave buffer 202 that is smaller than a master buffer 201. For the purpose of the present example, the master buffer 201 is shown to be eight-entries deep and can store only up to eight request queues at a time whereas the slave buffer 202 is four-entries deep and can store only four request queues at a time. It is noted, however, that the master buffer 201 and the slave buffer 202 can be of any buffer size without deviating the scope of the present disclosure.

Some of the requests placed in the master buffer 201 may include mapping to the same bank(s). In the present example, the requests in the master buffer 201 include four consecutive bank 0 requests followed by bank 1, bank 2, bank 3, and bank 4 requests. Here, the bank requests may be a read request or a write request. The scheduler 112 of the master controller 110 sends the requests placed in the master buffer 201 to the slave buffer 202 based on the number of available entries in the slave buffer 202 and pushes the remaining entries up in the master buffer 201. Initially, the slave buffer 202 is empty, so the first four buffer entries of the master buffer 201 including the four consecutive bank 0 requests are sent to the slave controller and placed in the slave buffer 202. Since the requests that arrive at the slaver buffer 202 include only the four consecutive bank 0 requests, the slave controller is not capable of performing bank interleaving. Accordingly, one core of the slave controller 120 accesses (read or write) bank 0 for four times in a row while other cores of the slave controller 120 are idling that are otherwise capable of accessing other banks This results in bank conflicts causing a slow response time.

When the master controller has the address mapping information and memory configuration information of the memory device, for example, a channel ID, a rank ID, a bank ID, and a row ID of incoming requests, the master controller can re-order CPU requests and send the reordered (or interleaved) requests to the slave controller. Referring to FIG. 2A, the master buffer 201 does not have bank ID information because the master controller does not have the address mapping information. Therefore, the master controller 110 merely sends out the requests as they are stored in the master buffer 201. The reordering by the master controller based on the address mapping information, according to one embodiment of the present disclosure, can achieve more efficient bank interleaving.

Figure 2B:
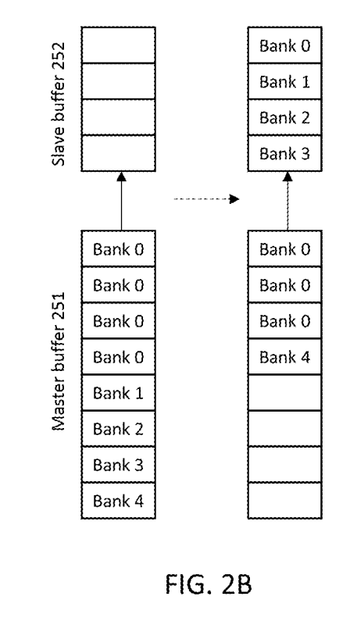
FIG. 2B shows an exemplary memory mapping between a master buffer and a slave buffer, according to one embodiment.

FIG. 2B shows an example memory mapping between a master buffer and a slave buffer, according to one embodiment of the present disclosure. Similar to the example of FIG. 2A, the master buffer 251 includes four consecutive bank 0 requests followed by bank 1, bank 2, bank 3, and bank 4 requests. Initially, the slave buffer 202 is empty, so the master controller is allowed to send the four requests in the master buffer 251 to the slave controller. Knowing the address mapping information of the memory device, the master controller can reorder the requests in the master buffer 251 to include the first bank 0 request, and the bank 1, bank 2, and bank 3 requests instead of the first 4 requests in the master buffer 251. In this case, the slave controller can perform bank interleaving by simultaneously accessing bank 0, bank 1, bank 2, and bank 3 using the available cores of the slave controller.

According to one embodiment, the master controller and the slave controller can exchange address mapping options at a system boot time, and a user can decide which address mapping scheme to use. The address mapping scheme can remain unchanged until the system reboots or the user reconfigures the address mapping scheme on the fly. When selecting an address mapping scheme at a system boot time, the memory system can configure a hardware decoder inside the memory controller. The hardware decoder can decode incoming addresses to the physical address in the DRAM corresponding to channel, rank, bank and row IDs.

A close page starts with a precharge command after every memory access (i.e., read and write). A close page reduces latency for row buffer misses but may increase latency for row buffer hits because the closed page has to be opened again in the case of row buffer hits. Open pages delay a precharge until a miss. Open pages minimize latency for row buffer hits but may increase latency for row buffer misses. Depending on the rates of row buffer misses and hits, the slave controller determines when to close, open, and precharge.

The present transaction-based memory system provides a mature open page policy. In a conventional memory system, a slave controller scans the slave buffer and closes a page if no locality is found. In other words, a page open and close is determined solely by the locality of the slave buffer although there might be pending request that could benefit from an open page. Because the slave controller typically has a small slave buffer, the slave controller cannot apply a mature open page policy by foreseeing forthcoming requests from the master controller. In this sense, an open page policy implemented solely by the slave controller and limited by the size of the slave buffer often results in a premature closure of an open page.

According to one embodiment, the master controller can scan the master buffer 251 and provide information regarding a page opening and closing to the slave controller. The master controller lets the slave controller close an open page if no locality is found in the master buffer 251. Because the master controller has a deeper buffer and foresees more requests ahead, the master controller can provide more effective open-page policy and row buffer management.

Figures 3A, 3B:
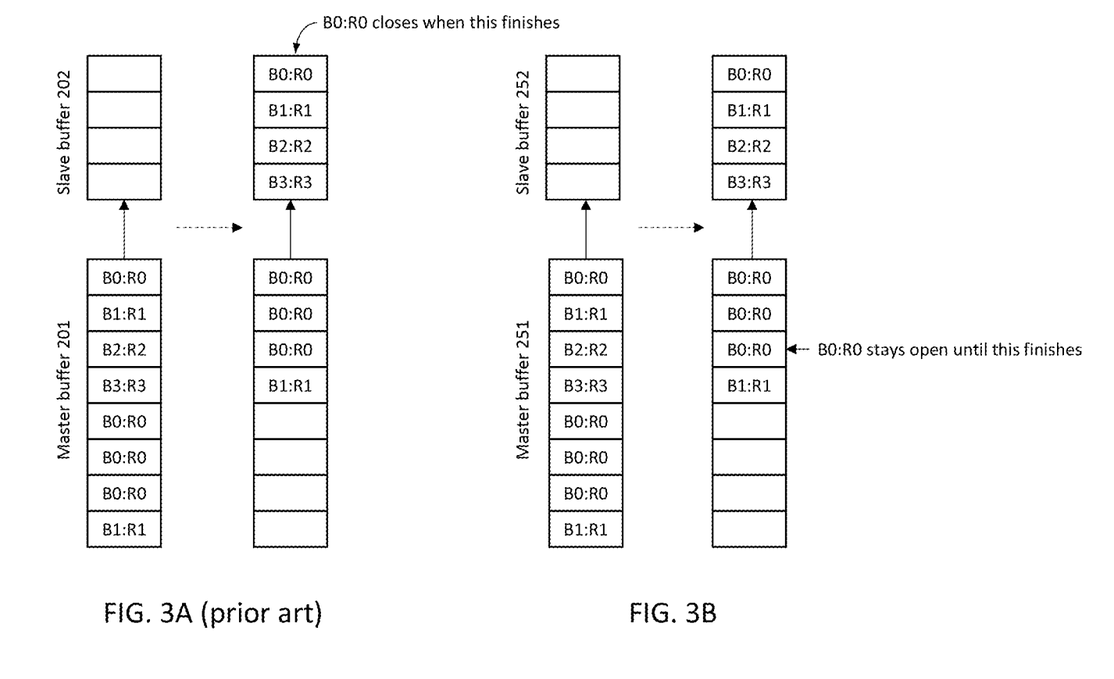
FIG. 3A shows a comparative example of a page open policy of a slave controller.
FIG. 3B shows an example of a page open policy of the present transaction-based memory system, according to one embodiment.

FIG. 3A shows a comparative example of a page open policy of a slave controller. Each request is represented by its bank number and row buffer number. For example, Bn:Rm represents bank number n and a row buffer number m. Each bank has its own dedicated row buffer. There are several rows inside a bank. By opening a row, data is placed from the row to the row buffer associated with the bank. The row buffer serves as a fast cache in the DRAM. A row access activates a row (page) of a bank of the DRAM and copies the data from the activated row (open page) in the row buffer. A column access selects a column of the activated row and returns a block of data that corresponds to the activated row and the selected column. A precharge charges a bank of the DRAM before accessing the activated row. A refresh periodically reads and writes DRAM to maintain data in the DRAM.

The master controller sends a portion of transaction queues in the master buffer 201 to the slave controller, and the slave controller places the received queues in the slave buffer 202. Initially, the example slave buffer 202 of four-entries deep is empty, so the four queues in the master buffer 201 are copied to the slave buffer 202. The queues copied to the slave buffer 202 include only one queue for a page for B0:R0, therefore the slave controller opens the page for B0:R0 and closes the open page after the queue for B0:R0 is completed. Since the master controller does not share information (e.g., queues in the master buffer 201) with the slave controller, the slave controller closes an open page when no more queues for the open page await in the slave buffer 202. In this case, the determination for keeping a page open and closing a page is solely determined by the logic of the slave controller based on the queues available in the slave buffer 202.

FIG. 3B shows an example of a page open policy of the present transaction-based memory system, according to one embodiment of the present disclosure. The present transaction-based memory can extend the page open policy by referring to the queues in the master buffer 251. Initially, the slave buffer 252 is empty, so the four queues in the master buffer 251 are copied to the slave buffer 252. The queues copied to the slave buffer 252 include only one queue for a page for B0:R0. However, the master buffer 251 includes pending queues for the page for B0:R0. Accordingly, the master controller can send an instruction (e.g., a flag) to the slave controller to keep the page for B0:R0 open because the pending queues for the same page will follow. In response to the master controller's instruction, the slave controller can keep the page open until the awaiting queues for the same page arrive and the corresponding memory transactions are completed. The flags exchanged between the master controller and the slave controller for an extended page open policy are explained in further detail with reference to FIG. 4.

Figure 4:
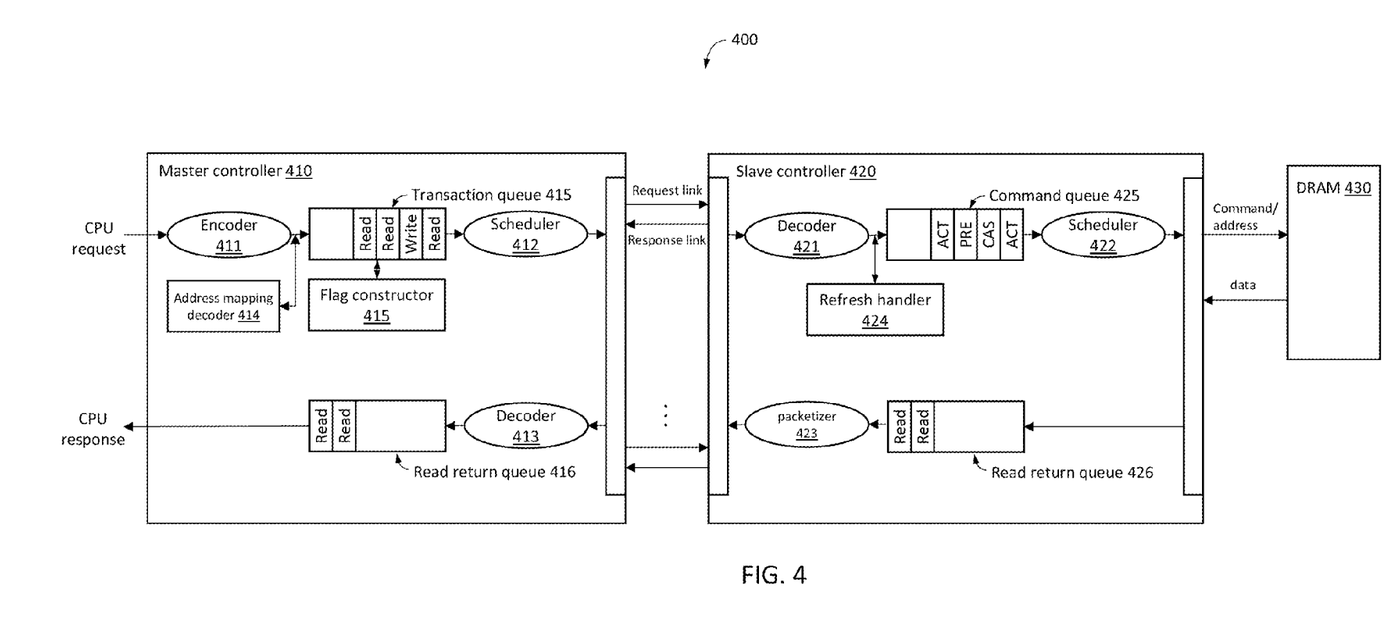
FIG. 4 shows an exemplary transaction-based memory system, according to one embodiment.

FIG. 4 shows an example transaction-based memory system, according to one embodiment. Similar to the memory system 100 of FIG. 1, the transaction-based memory system 400 includes a master controller 410 (e.g., memory controller) and the slave controller 420 (e.g., DRAM controller), and a memory device 430 (e.g., DRAM). The master controller 410 receives a request from a CPU to access the memory device 430 and responds to the CPU corresponding to the request.

Although the master controller 410, the slave controller 420, and the memory device 430 are shown in separate blocks, it is understood that the master controller 410, the slave controller 420, and the memory device 430 can be implemented and configured in various ways. According to one embodiment, the slave controller 420 may reside in the memory device 430, and the memory device 430 is configured to be inserted into a memory slot of a host computer. According to another embodiment, the slave controller 420 may reside in the master controller 410 of a host computer.

The master controller 410 can include an encoder 411, a scheduler 412, a decoder 413, an address mapping decoder 414, and a flag constructor 415. The address mapping decoder 414 can store the address mapping information of the memory device 430 including its channel, rank, bank and row information and applies the address mapping information to an encoded transaction queue having a channel ID, rank ID, a bank ID, and a row ID. Because the address mapping decoder 414 may reorder the encoded transaction queue based on the address mapping information as shown in the example of FIG. 2B, the master controller 410 may keep the same address mapping as the slave controller 420. For example, when a new memory device 430 is inserted, the slave controller 420 sends the address mapping information of the new memory device 430 to the master controller 410 during a system boot time. The address mapping decoder 414 decodes the requests for both interleaving and row buffer management.

The scheduler 412 can employ various scheduling schemes to optimize bank, rank, DIMM, and XOR interleaving. Examples of scheduling include, but are not limited to, a channel round robin, a rank round robin, and a bank round robin. The flag constructor 415 can set additional flags to facilitate the exchange of information between the master controller 410 and the slave controller 420. These flags can be used to keep a page open based on an extended page open policy as explained with reference to the example of FIG. 3B. Examples of the additional flags include, but are not limited to, require activate (requireACT) and require precharge (requirePRE). These flags may be packetized with the requests in the transaction queue 415.

The slave controller 420 includes a decoder 421, a scheduler 422, a packetizer 423, and a refresh handler 424. The decoder 421 can translate straightforward request packets to memory commands based on the requireACT and requirePRE flags. The refresh handler 424 can perform a simple refresh handling based on the requireACT and requirePRE flags when necessary. A refresh controller (not shown) of the slave controller 420 continues to handle refresh operations. The refresh handler 424 can be responsible for handling the refresh situation. For example, the refresh handler 424 interrupts a standard refresh operation based on the flags and resumes the refresh operation from a state before the refresh operation after handling the refresh situation.

Table 1 describes the two additional flags, requireACT and requirePRE that can be constructed by the flag constructor 415. The requireACT flag is set to be true when a packet needs a full address (row and column address). Using the full address of the packet, the slave controller 420 decodes a received packet into row address select (RAS)—column address select (CAS) (or RAS-CAS write (CASW)). On the other hand, the requireACT flag is set to false when the packet only needs a partial address, for example, only a column address. In this case, the slave controller 420 has an active row (RAS) and decodes the packet into CAS (or CASW).

The requirePRE flag is set to true when the master controller 410 determines that a row spatial locality does not exist in the master buffer. The slave controller 420 appends a precharge command to a previous command to be ready to close the open page and open a new page. On the other hand, the requirePRE flag is set to false when a row spatial locality does exist. In this case, the slave controller 420 does not append a precharge command to a previous command, and the open page is kept open until the requirePRE flag is set to true to close the open page.

TABLE 1

|  | True | False |
| --- | --- | --- |
| requireACT | Packet needs full address Slave controller decodes the packet into RAS-CAS (or RAS-CASW) | Packet only needs partial address (i.e., only column address) Slave controller decodes the packet into CAS (or CASW) |
| requirePRE | Row spatial locality does not exist Slave controller appends PRE to the previous command | Row spatial locality exists Slave controller does not append PRE to the previous command |

The following pseudo-code provides an example illustration of how the master controller 410 can construct and manage the requireACT and requirePRE flags. The master controller 410 includes a transaction queue 415 referred to as an inputBuffer in the pseudo code. Both the requireACT and requirePRE flags are initially set to true. The master controller 410 can scan incoming requests in the transaction queue 415. When an incoming request has the same channel, rank, bank, and row as a pending request in the transaction queue 415, the requirePRE flag of the pending request is set to false. The false requirePRE flag leaves the corresponding page open until the incoming request is processed. In the meantime, the requireACT flag and the requirePRE flag of the incoming request are respectively set to false and true. Once a match is found in the queue from the tail, the scanning process can stop. This is because continuing the scanning process after a match is found may make unwanted changes to other pending requests and modify the flags of the pending requests. When there is a no match, the requireACT flag and the requirePRE flag are unchanged and set to true such that the slave controller 420 can freely close an open page.

```
// inputBuffer: master controller's transaction queue
// inputBuffer.back( ): incoming request
// initialize the incoming request
inputBuffer.back( ).requireACT = true;
inputBuffer.back( ).requirePRE = true;
if (inputBuffer.size( ) > 1)
{
    // scan the transaction queue from the tail
    for (j=inputBuffer.size( )-2; j!=-1; j--)
    {
        // same row
        if ((inputBuffer.back( ).channel == inputBuffer[j].channel) &&
            (inputBuffer.back( ).rank == inputBuffer[j].rank) &&
            (inputBuffer.back( ).bank == inputBuffer[j].bank) &&
            (inputBuffer.back( ).row == inputBuffer[j].row))
        {
            inputBuffer[j].requirePRE = false;
            inputBuffer.back( ).requireACT = false;
            inputBuffer.back( ).requiredPRE = true;
            break; // prevent unwanted changes to earlier pending requests
        }
        // same bank but different row
        else if ((inputBuffer.back( ).channel == inputBuffer[j].channel) &&
            (inputBuffer.back( ).rank == inputBuffer[j].rank) &&
            (inputBuffer.back( ).bank == inputBuffer[j].bank) &&
            (inputBuffer.back( ).row != inputBuffer[j].row))
        {
            break; // prevent unwanted changes to earlier pending requests
        }
    }
}
```

With the flags provided by the master controller 410, the slave controller 420 can translate incoming packets to memory commands based on the states of the requireACT and requirePRE flags. Table 2 shows examples of the memory commands that the decoder 421 of the slave controller 420 can generate from the incoming packets from the master controller 410 based on the states of the requireACT and requirePRE flags. When the requireACT flag and the requirePRE flag are both true, the decode packet 421 can issue RAS-CAS-PRE or RAS-CASW-PRE commands. When the requireACT flag is true but the requirePRE flag is false, the decode packet 421 can issue RAS-CAS or RAS-CASW commands without appending a PRE command. When both the requireACT flag and the requirePRE flag are false, the decode packet 421 can issue CAS or CASW command without activating a row or appending a PRE command. When the requireACT flag is true but the requirePRE flag is false, the decode packet 421 can issue CAS-PRE or CASW-PRE commands without activating a row.

TABLE 2

|  | Packet to command decode |
| --- | --- |
| requireACT == true && requirePRE == true | RAS-CAS-PRE (or RAS-CASW-PRE) |
| requireACT == true && requirePRE == false | RAS-CAS (or RAS-CASW) |
| requireACT == false && requirePRE == false | CAS (or CASW) |
| requireACT == false && requirePRE == true | CAS-PRE (or CASW-PRE) |

The slave controller 420 handles refreshes differently to accommodate the changes of the master controller 410, particularly due to the implementation of the two additional flags, requireACT and requirePRE. The following pseudo-code example illustrates how the refresh handler 424 of the slave controller 420 can handles refresh commands. When a page is open, the refresh handler 424 can determine when and how early to enforce a precharge command. When the current bank state is not in an active row state and the last command is a precharge command, the refresh handler 424 can determine a forced precharge. To enforce a precharge, an activate command and a precharge command can be inserted. The precharge command is issued first, the refresh command is implicitly issued, and thereafter the activate command is issued. The activate command reopens the row when the refresh command completes. When a refresh counter reaches zero, every bank is in an idle state, and refresh commands are issued.

```
if (bufferPolicy = OPEN_PAGE)
{
   // if it's time to refresh, force precharge to happen early
   if (!canIssueRefresh && !prechargeEarly)
   {
      for (b=0; b<NUM_BANKS; b++)
      {
         // r: rank ID
         // these cases do not require forced precharge
         if ((bankStates[r][b].currentBankState != ROW_ACTIVE) ||
            (bankStates[r][b].lastCommand == PRECHARGE))
         {
            continue;
         }
         // insert ACT then PRE
         // PRE will be issues first, then PEF (implicit), then ACT
         // ACT is for reopening the rows when refresh completes
         commandQueue.push_front(busPacket(ACTIVATE,
         bankStates[r][b].openRowAddress));
         commandQueue.push_front(busPacket(PRECHARGE,
         bankStates[r][b].openRowAddress));
      }
      prechargeEarly = true;
   }
}
// once refresh counter has reached 0 and every bank is idle
// issue refresh
```

According to one embodiment, the scheduler 412 can schedule the transaction queue 415 of the master controller 410 and the command queue 425 of the slave controller 420 to optimize interleaved memory transactions. The scheduler 412 can maintain request dependencies by the master controller 410 and the slave controller 420. The scheduler 412 can further maintain memory command dependencies by the slave controller 420 while obeying timing constraints when accessing the memory device 430. The scheduler 412 can optimize the memory performance by reordering pending requests in the transaction queue 415 of the master controller 410. The master controller 410 tries to send request as quickly as possible maximizing parallelism, thus enhancing the performance of the memory system 400.

The pending commands in the slave controller 420 may be reordered in a way that the slave controller 420 can issue commands as quickly as possible to optimize the performance. As long as the request dependencies are maintained (e.g., read write sequence), and the command dependencies are maintained (e.g., RAS CAS sequence), and if there is resource available (e.g., bank is not busy), the scheduler 412 can keep issuing commands associated with the incoming requests. For instance, the scheduler can receive a sequence of commands to access banks 1, 1, 1, and 2. The scheduler 412 may reorder the commands such that the bank sequence becomes 1, 2, 1, and 1. In other words, for the command that accesses bank 2, the scheduler 412 does not need to wait for all the prior commands to finish. As long as the request and command dependencies are met, and the resources are available, the scheduler 412 may reschedule the incoming requests and issue the rescheduled requests as quickly as possible to optimize the performance.

According to one embodiment, a memory system includes a master controller, an interface with a host computer, and a link bus configured to couple with a slave controller. The master controller includes an address mapping decoder, a transaction queue, and a scheduler. The address mapping decoder is configured to decode address mapping information of a memory device coupled to the slave controller. The scheduler of the master controller is configured to reorder memory transaction requests received from the host computer in the transaction queue using the address mapping information of the memory device. The memory system employs an extended open page policy based on the pending memory transaction requests in the transaction queue of the master controller.

The address mapping information may include a channel ID, a rank ID, a bank ID, and a row ID.

The master controller may further include a flag constructor, and the master controller may send a plurality of flags constructed by the flag constructor to the slave controller over the link bus.

The plurality of flags may include a require activate flag and a require precharge flag.

The flag constructor may be configured to set the require precharge flag to render an activated page of the memory device open when an incoming memory transaction request received from the host computer includes a channel ID, rank ID, a bank ID and a row ID of a pending memory transaction request in the transaction queue.

According to one embodiment, a memory module includes: a slave controller including a decoder, a scheduler, a command queue, and a read return queue; and a memory device. The decoder is configured to receive memory transaction requests, generate memory commands based on the memory transaction requests, and place the memory commands in the command queue. The decoder is further configured to receive a plurality of flags and reorder the memory commands in the command queue based the plurality of flags.

The slave controller may further include a refresh handler configured to change and reorder the memory commands in the command queue based on the plurality of flags and handle refresh operation on the memory device based on the changed and reordered memory commands.

The scheduler may be configured to send the memory commands and addresses associated with the memory commands to the memory device based on the memory commands in the command queue.

The memory module may further include a packetizer and a read return queue. Data received from the memory device may be placed in the read return queue, and the packetizer may be configured to generate packets including the data and send the packets to a master controller over a link bus.

The slave controller may further include a second scheduler configured to send the memory commands and addresses associated with the memory commands to the memory device in an order the memory commands are placed in the command queue.

According to one embodiment, a method for improving performance of a memory system includes: receiving address mapping information of a memory device from a slave controller over a link bus; receiving memory transaction requests from a host computer; placing the memory transaction requests in a transaction queue; and reordering the memory transaction requests in the transaction queue using the address mapping information of the memory device.

The address mapping information may include a channel ID, rank ID, a bank ID, and a row ID.

The method may further include constructing a plurality of flags and sending the plurality of flags to the slave controller over the link bus.

The plurality of flags may include a require activate flag and a require precharge flag.

The method may further include setting the require precharge flag to render an activated page of the memory device open when an incoming memory transaction request received from the host computer includes a channel ID, a rank ID, a bank ID and a row ID of a pending memory transaction request in the transaction queue.

According to one embodiment, a method for improving performance of a memory system include: sending address mapping information of a memory device to a master controller over a link bus; receiving memory transaction requests; decoding the memory transaction requests and generating memory commands based on the decoded memory transaction requests; placing the memory commands in a command queue; receiving a plurality of flags; and reordering the memory commands in the command queue based the plurality of flags.

The method may further include changing and reordering the memory commands in the command queue based on the plurality of flags and handing refresh operation on the memory device based on the changed and reordered memory commands.

The method may further include sending the memory commands and addresses associated with the memory commands to the memory device based on the memory commands in the command queue.

The method may further include placing data received from the memory device in the read return queue, generating packets including the data, and sending the packets to a master controller over a link bus.

The method may further include sending the memory commands and addresses associated with the memory commands to the memory device in an order the memory commands are placed in the command queue.

The above example embodiments have been described hereinabove to illustrate various embodiments of implementing a system and method for interfacing co-processors and input/output devices via a main memory system. Various modifications and departures from the disclosed example embodiments will occur to those having ordinary skill in the art. The subject matter that is intended to be within the scope of the invention is set forth in the following claims.

What is claimed is:

1. A memory system comprising:
   a master controller including an address mapping decoder, a transaction queue, and a scheduler;
   an interface with a host computer; and
   a link bus configured to couple with a slave controller,
   wherein the address mapping decoder is configured to decode address mapping information of a memory device coupled to the slave controller, and
   wherein the scheduler of the master controller is configured to reorder memory transaction requests received from the host computer in the transaction queue using the address mapping information of the memory device.

2. The memory system of claim 1, wherein the address mapping information includes a channel ID, a rank ID, a bank ID, and a row ID.

3. The memory system of claim 1, wherein the master controller further includes a flag constructor and the master controller sends a plurality of flags constructed by the flag constructor to the slave controller over the link bus.

4. The memory system of claim 3, wherein the plurality of flags includes a require activate flag and a require precharge flag.

5. The memory system of claim 4, wherein the flag constructor is configured to set the require precharge flag to render an activated page of the memory device open when an incoming memory transaction request received from the host computer includes a channel ID, a rank ID, a bank ID and a row ID of a pending memory transaction request in the transaction queue.

6. A memory module comprising:
   a slave controller including a decoder, a scheduler, a command queue, and a read return queue; and
   a memory device;
   wherein the decoder is configured to receive memory transaction requests, generate memory commands based on the memory transaction requests, and place the memory commands in the command queue, and
   wherein the decoder is further configured to receive a plurality of flags and reorder the memory commands in the command queue based the plurality of flags.

7. The memory module of claim 6, wherein the slave controller further includes a refresh handler configured to change and reorder the memory commands in the command queue based on the plurality of flags and handle refresh operation on the memory device based on the changed and reordered memory commands.

8. The memory module of claim 6, wherein the scheduler is configured to send the memory commands and addresses associated with the memory commands to the memory device based on the memory commands in the command queue.

9. The memory module of claim 6, further comprising a packetizer and a read return queue, wherein data received from the memory device is placed in the read return queue, and the packetizer is configured to generate packets including the data and send the packets to a master controller over a link bus.

10. The memory module of claim 6, wherein slave controller further includes a second scheduler configured to send the memory commands and addresses associated with the memory commands to the memory device in an order the memory commands are placed in the command queue.

11. A method comprising:
    receiving address mapping information of a memory device from a slave controller over a link bus;
    receiving memory transaction requests from a host computer;
    placing the memory transaction requests in a transaction queue; and
    reordering the memory transaction requests in the transaction queue using the address mapping information of the memory device.

12. The method of claim 11, wherein the address mapping information includes a channel ID, a rank ID, a bank ID, and a row ID.

13. The method of claim 11, further comprising constructing a plurality of flags and sending the plurality of flags to the slave controller over the link bus.

14. The method of claim 13, wherein the plurality of flags includes a require activate flag and a require precharge flag.

15. The method of claim 14, further comprising setting the require precharge flag to render an activated page of the memory device open when an incoming memory transaction request received from the host computer includes a channel ID, a rank ID, a bank ID and a row ID of a pending memory transaction request in the transaction queue.

16. A method comprising:
sending address mapping information of a memory device to a master controller over a link bus;
receiving memory transaction requests;
decoding the memory transaction requests and generating memory commands based on the decoded memory transaction requests;
placing the memory commands in a command queue;
receiving a plurality of flags; and
reordering the memory commands in the command queue based the plurality of flags.

17. The method of claim 16, further comprising changing and reordering the memory commands in the command queue based on the plurality of flags and handing refresh operation on the memory device based on the changed and reordered memory commands.

18. The method of claim 16, further comprising sending the memory commands and addresses associated with the memory commands to the memory device based on the memory commands in the command queue.

19. The method of claim 16, further comprising placing data received from the memory device in the read return queue, generating packets including the data, and sending the packets to a master controller over a link bus.

20. The method of claim 16, further comprising sending the memory commands and addresses associated with the memory commands to the memory device in an order the memory commands are placed in the command queue.

* * * * *